Patented Aug. 12, 1941

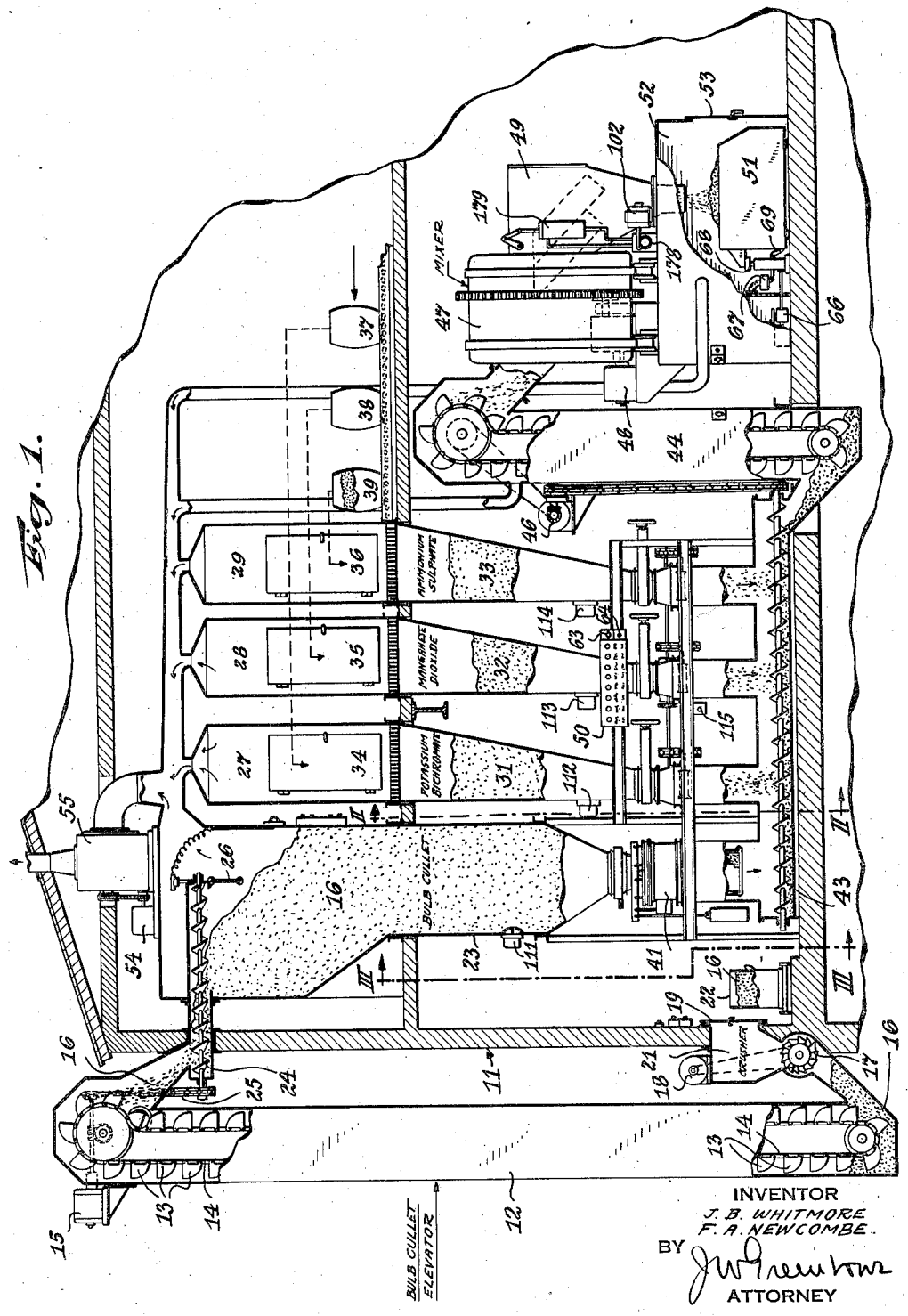

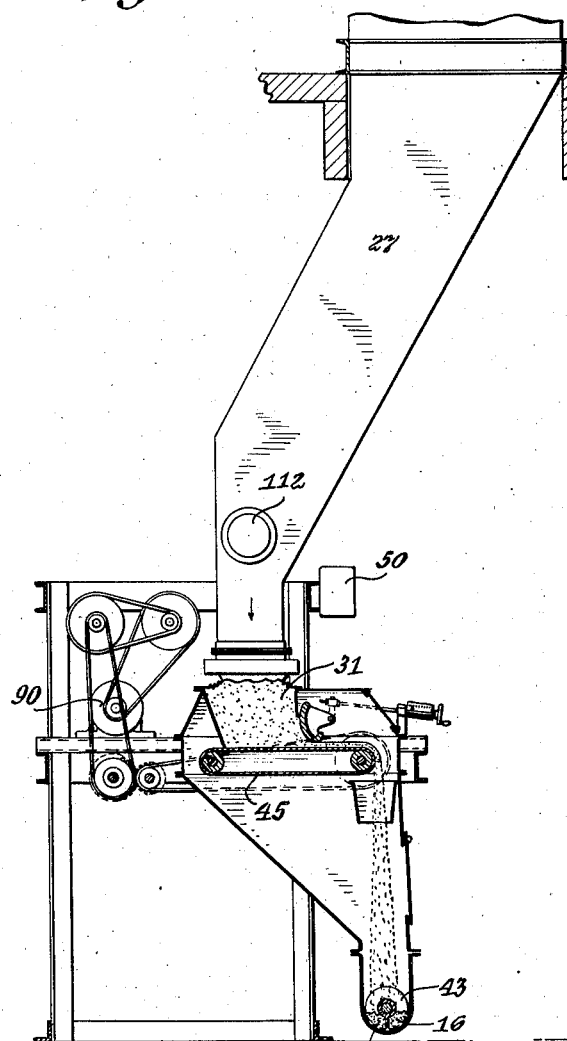
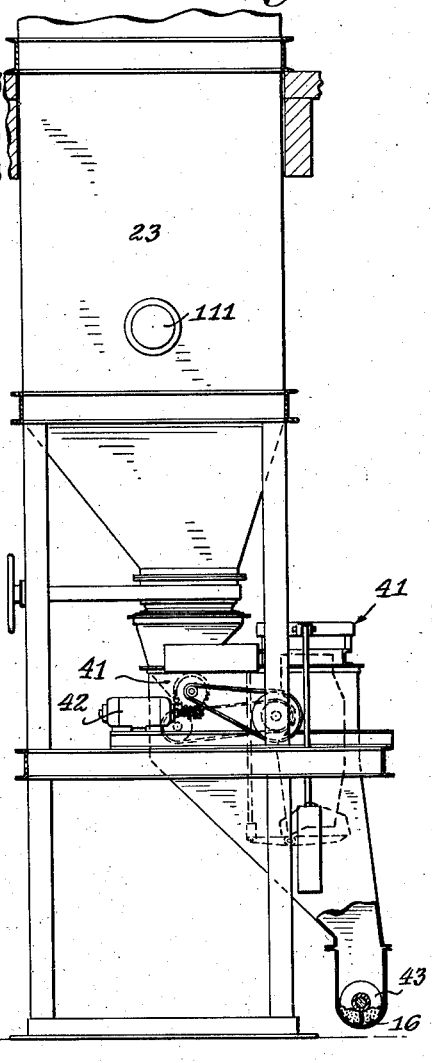
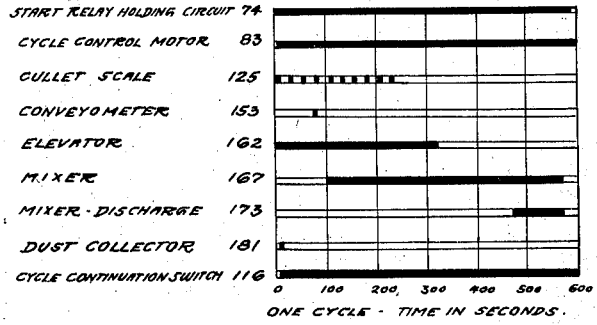
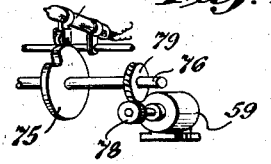

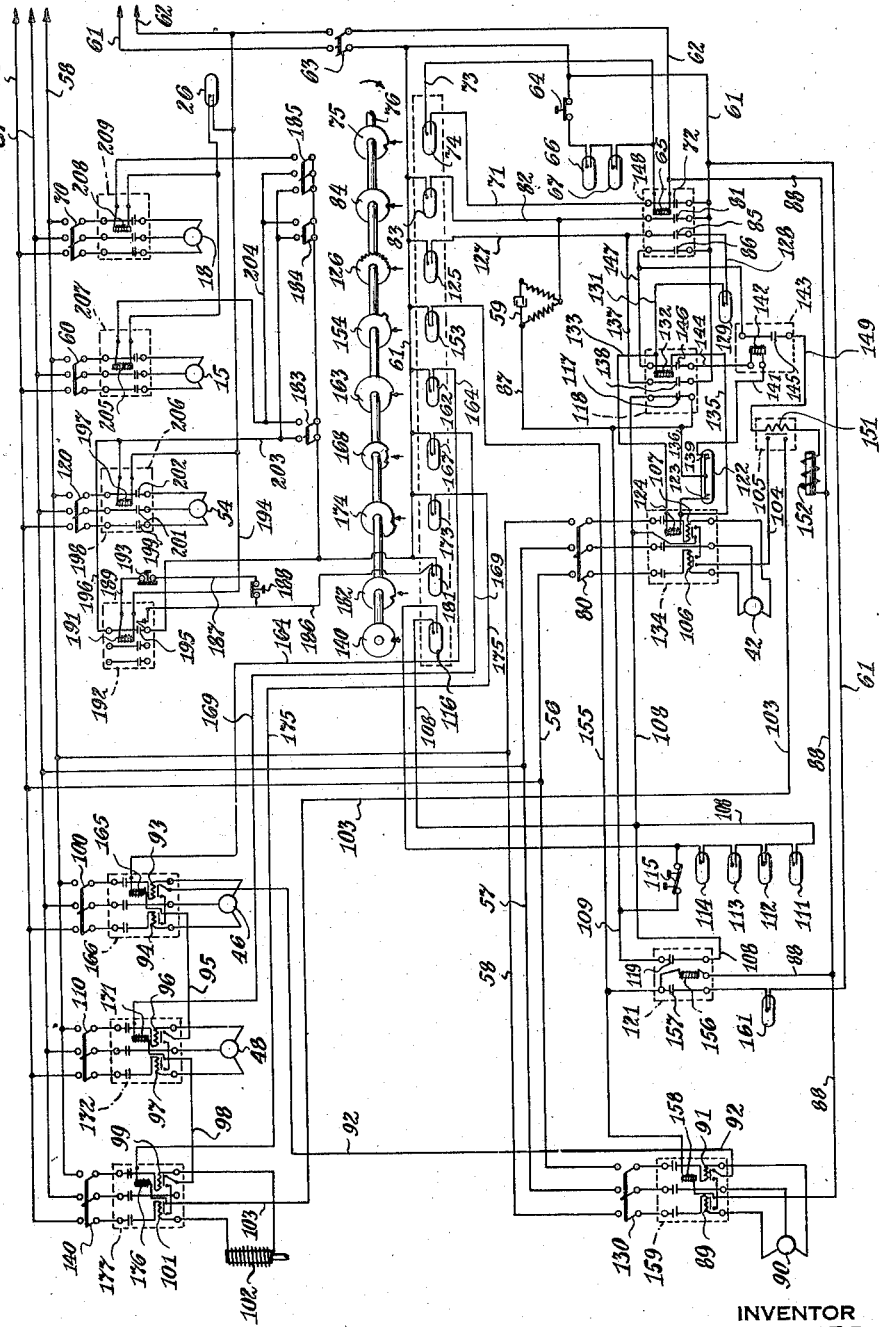

2,252,589

UNITED STATES PATENT OFFICE 2,252,589

GLASS MAKING

James Bryant Whitmore, Bloomfield, and Frank A. Newcombe, Nutley, N. J., assignors to Westinghouse Electric & Manufacturing Company, East Pittsburgh, Pa., a corporation of Pennsylvania Application September 1, 1939, Serial No. 293,014

5 Claims. (Cl. 259—3)

This invention relates to handling the materials for making glass, and more particularly to a machine for receiving glass cullet and chemicals used for making a special kind of glass, crushing said cullet, mixing it with said chemicals and delivering it to a receptacle, all automatically upon the mere closing of an electric circuit.

The principal object of our invention, generally considered, is the automatic mixing of glass-making materials, and delivery thereof to a receptacle, without manual labor and in accordance with an accurately predetermined schedule.

Another object of our invention is the construction of a machine, automatically controlled by electric circuits in accordance with a predetermined schedule, whereby glass-making materials are received thereby, automatically proportioned and mixed to produce a predetermined glass formula, the components of said formula being transported and elevated to a mixer, from which they are automatically discharged to a receptacle prior to transfer to a glass furnace.

A feature of the invention is that the apparatus cannot be operated if there is not an empty batch box under the mixer discharge.

Another feature of the invention is that the cycle control motor cannot operate unless or until there is enough material in the bins to make one batch and the discharge door of the cullet scale hopper is closed.

A further feature of the invention is that once the machine is started it will complete one cycle even though a bin is emptied during the cycle.

Another feature of the invention is that dust hazard is eliminated by having the cycle control start the dust collector, which then continues until it is manually stopped.

A still further feature of the invention is that if any part of the system becomes jammed or overloaded during operation, the entire machine stops immediately and cannot be restarted until the trouble is obviated.

An additional feature of the invention is that means are provided for automatically cutting off the mechanism which fills the bulb cullet bin when the material therein reaches a certain level.

Other objects, features, and advantages of the invention, relating to the particular arrangement and construction of the various parts, will become apparent as the description proceeds.

Referring to the drawings illustrating our invention:

Figure 1 is a side elevational view, partly in vertical section, of apparatus embodying our invention.

Figure 2 is a sectional view on the line II—II of Figure 1, showing a portion of the apparatus on an enlarged scale, in the direction of the arrows.

Figure 3 is a sectional view on the line III—III of Figure 1, showing another portion of the apparatus on an enlarged scale, in the direction of the arrows.

Figure 4 is a detailed perspective view of a portion of the apparatus illustrated in Figures 1 and 2.

Figure 5 is a diagram showing the periods of time the various portions of the apparatus are in operation.

Figure 6 is a wiring diagram showing the electrical circuits used in the operation of our apparatus.

Prior to our invention, glass batch mixing systems consisted of storage bins for raw materials, with gates at the bottom ends to drain said materials out. A wheelbarrow was used to convey the materials to a floor scale. After weighing, the materials were dumped into a loading pan attached to a concrete mixer. By manipulating a series of levers, the charge was conveyed to the mixer, mixed, and discharged into a batch box. The entire process was very dusty and required considerable manual labor.

A conventional batch-mixing system, as used by most glass plants, consists of very large silos with a gate under the bottom of each, and a traveling scale and hopper for collecting raw materials, and conveying same to the mixer, where they are mixed and dumped into a larger hopper. The hopper and mixed batch are then conveyed as a unit to the furnace. Such a system only partly protected the workers from dust and is manually controlled throughout.

Referring to the drawings in detail, which show our improved form of automatic glass batch mixer, and first referring to Figures 1, 2 and 3, there is shown installed, in connection with a building 11, a glass cullet elevator 12, consisting of a series of buckets 13 on an endless belt 14, is driven by means of a motor 15, to raise cullet or other glass-making material 16, received from a crusher 17, driven by a motor 18. The glass-making material 16 is delivered to the crusher through door 19 into hopper 21, as from barrels or trucks 22, elevated and discharged to bin 23 from the top of elevator 12, as by means of screw conveyor 24, driven from shaft of motor 15, as by means of chain 25. An automatic switch 26 is desirably positioned near the top of bin 23 so as to cut off the crusher and elevator motors, 18 and 15, when the bin is full.

Next to the glass cullet bin are three bins 27, 28 and 29, which may be similar and which contain the various chemicals needed for making the special kind of glass under consideration. In the present embodiment, the bin 27 is indicated as holding potassium bichromate 31, the bin 28 as holding manganese dioxide 32, and the bin 29 as holding ammonium sulphate 33. These bins are loaded through doors 34, 35 and 36, from barrels or other receptacles 37, 38 and 39.

Beneath the glass cullet bin is an automatic cullet scale 41 driven by a motor 42, whereby when the apparatus is in operation a given amount of cullet is weighed and automatically discharged upon the conveyor worm 43 therebeneath, for transfer to the elevator 44 along with corresponding batches of the chemicals 31, 32 and 33, which are automatically discharged upon said worm by conveyometers 45, illustrated diagrammatically in Figure 2. Inasmuch as the automatic scale 41 and the conveyometers 45 are not in themselves new, it is not necessary to describe them in detail.

The operation of the worm 43 and bucket elevator 44, as by means of motor 46, delivers the materials to the mixer 47, driven by motor 48, from which it is discharged at the proper time through hopper 49 into batch box 51 contained in a box 52 closed by a door 53.

In order to protect the workers from dust during the operation of our apparatus, a motor 54 drives a blower 55 to create a partial vacuum over the glass cullet bin 23, chemical bins 27, 28 and 29 and other parts of the apparatus in the building 11, such as the elevator 44 and batch box 52, thereby drawing the dust out of the building and creating such a suction that the opening of any doors during the operation, will result in air being drawn in rather than dust being blown out, of the connected apparatus just described.

*Description of circuits and operation*

The circuit for operating the mechanism is illustrated in Figure 6, and the schedule of operations is charted in Figure 5. A consideration of Figure 6 will show that the operating motors 15, 18, 42, 46, 48, 54 and 90 are fed from three-phase lines, preferably 60 cycle, 220 volts, designated by the reference characters 56, 57 and 58, through manual switches 60, 70, 80, 100, 110, 120 and 130, which are closed prior to operation, the cycle control motor 59, however, being desirably of the split-phase type and operated from single-phase lines 61 and 62, preferably 60 cycle, 110 volts. The mixer tilt solenoid 102 is fed from two lines, 56 and 58, through manual switch 140, closed prior to operation. Manual switches 183, 184 and 185 are for alternative operation of the dust collector 55 only, and are therefore left open for automatic operation of said dust collector. The outside elevator 12 and crusher 17 are not started automatically.

*Cycle control*

When the main switch 63 in the single phase lines 61 and 62 is closed, the control equipment is connected therewith. In this line we have provided a normally open starting button 64, which may be mounted on a control board 50, as shown in Figure 1. When this is pressed, a circuit is made that energizes the starting relay coil 65 through mercury safety switches 66 and 67. These switches are only closed when there is an empty batch box 51 under the hopper 49. In case the batch box 51 is filled, it presses down on the element 68 and opens switch 66. If, on the other hand, there is no batch box in position, the lever 69 is not moved to close the switch 67.

When the starting relay 65 is energized, the line 61 is connected to line 71 through contacts 72 closed by said relay 65. Line 71 connects to line 73 through cycle control switch 74 already closed by its cam 75 mounted on shaft 76, operated by motor 59, the details of which are shown in Figure 4. That is, the motor 59 has a worm 78 on its armature shaft, meshing with a worm wheel 79 on the shaft 76, to operate the various cams thereon, which, in turn, close the associated mercury switches at the high points, and open them at the low points, on the cams. The motor speed and reduction gearing between the motor and shaft 76 are desirably such, that said shaft makes one revolution every ten minutes of motor operation.

Line 73 connects to one side of the starting-relay-hold up coil 65, the other side of said hold up coil connecting to line 62. This circuit, therefore, keeps the starting relay energized even after release of the starting button 64.

With the starting relay 65 energized, contacts 81 are closed, connecting line 61 to one side of the cycle control motor 59 through line 82. Line 82 also connects to one side of mercury switch 83, the other side of which connects with line 61.

Line mercury switch 83 is operated by a cam designated by the reference character 84, on the same shaft 76. Switch 74 is assumed to be in closed position prior to pressing the starting button 64. Prior to the end of the operating cycle, switch 74 is opened by cam 75, allowing starting relay coil 65 to drop out, opening contacts 72, 81, 85 and 86. The cycle control motor 59 continues to operate, however, due to the circuit being maintained through switch 83, until such time as this mercury switch is opened by its cam. The opening of switch 83 is at the extreme end of the operating cycle, at which point, mercury switch 74 again closes.

The other side of the cycle control motor 59 connects to line 87, which is at one end of the control circuit, and connects to line 62 after passing through a series of overload circuits to be now described. This arrangement causes the cycle control motor 59, and all operating units to stop in case of an overload in any single unit.

The connections to line 87 will be described by starting at the source of current in line 62.

Line 62 connects through line 88 and two over load devices 89 and 91 in the circuit to the conveyometer motor 90, to line 92.

Line 92 connects through overload devices 93 and 94 in circuit to elevator motor 46, to line 95.

Line 95 connects through two overload devices 96 and 97 in circuit to mixer motor 48, to line 98.

Line 98 connects through two overload devices 99 and 101 in circuit to mixer tilt solenoid 102, to line 103.

Line 103 connects to line 104 through discharge solenoid overload heater unit 105.

Line 104 connects through two overload devices 106 and 107 in circuit to cullet scale motor 42, to line 108.

Line 108 connects to line 109 through four mercury switches 111, 112, 113 and 114, and "test switch" 115. These switches are mounted on material bins 23, 27, 28 and 29, respectively, and the respective switches are open if its bin becomes empty or the material therein drops below a point indicating insufficient material to produce one batch of the glass mix. Thus, if the circuit is not open, when the batch mixer is started, there is sufficient material in each bin to make at least one batch.

Mercury switch 116 is open at the start, but is closed immediately by its cam 140 after the button 64 is pressed and remains closed until the end of the operating cycle. The closing of this switch short-circuits the "bindicators" 111 to 114, inclusive, preventing them from having any effect once the machine is started.

However, should one of the "bindicator" switches open during the operating cycle, it will remain open unless or until sufficient material is added to the bin, so that the equipment cannot again be operated until the bin in question is in condition for such operation.

The "test switch" 115 is used to stop the mixing unit after the conveyometers have completed their cycle. This makes it possible to catch the discharged material from each conveyometer in pans, check the weights, return the material, start the equipment and continue the cycle.

In case any of the above-described units should be overloaded, the overload device (or devices) affected immediately heats up, breaks the circuit on that particular unit (or units), and causes the control motor to stop. As one side of the coil in each of the line starters is connected to this control circuit line, every line starter on the line circuit would also immediately open, stopping the entire operating equipment in case of an overload in any single unit.

Cullet weigher

When the beam switch 122, which is mounted on the automatic cullet-weighing scale 41, and operates mechanically from said scale, is positioned so that the circuit is closed through contacts 123, the coil 124 in the scale motor starter 134 is energized, when the mercury switch 125 is closed by its operating cam 126, causing the feeder belt of said cullet scale 41 to be operated and discharge the cullet upon the conveyor screw 43.

The operating electric circuit is from the line 61, through the mercury switch 125, through line 127, contacts 85 in start relay 148 operated by coil 64, to line 128. Line 128 connects through the interlocking switch 129, closed only when the discharge door of the cullet scale hopper is shut. If, for any reason, this door fails to shut, then the scale 41 will not function.

This switch 129 is necessary because the gate above the feeding scale could be so regulated that sufficient cullet would not enter the scale hopper during the time interval fixed. In this case the scale will weigh inaccurately. With the present connection, the scale will weigh accurately, but in case the feed is not adjusted properly, we will get less than ten weighings for each batch, which will immediately show up on a counter attached to the scale beam that counts each weighing that the scale makes. The counter always counts in units of ten when the scale is working properly. Should the scale miss a weighing, the counter will show a digit in the last counter column.

The circuit continues from switch 129 through line 131, to one side of the coil 132 in scale motor relay 118, and on through line 133 to one side of coil 124 in scale motor starter 134. The other side of the coil 124 is in parallel, with the other side of the coil 132 in relay 118, through line 135.

This parallel circuit 135 connects to one side of the beam switch 122 and completes the circuit through contacts 123. The line 135 connects through this beam switch to line 136.

Line 137 connects to line 61 through contacts 138 in relay 118. This is a holding circuit and keeps the cullet scale operating even though the circuit through mercury switch 125 is open, until scale beam switch 122 is tilted, breaking the circuit through contacts 123.

When the desired amount of cullet is on the scale 41, the beam switch 122 tilts and forms a circuit from line 136, through the beam switch, and contacts 139, to line 141. Line 141 connects through the coil 142 of discharge relay 143 to line 144. This causes the contacts 145 in discharge relay 143 to close.

Line 144 connects through contacts 146 in scale motor relay 118 to line 147, which connects to line 61 through contacts 86 in start relay 148.

Line 147 also connects to line 149 through contacts 145 in discharge relay 143, and then on through coil 151 in overload heater unit 105, through discharge solenoid 152 and line 88 to line 62. This completes the circuit and causes the scale hopper to dump immediately that the correct amount of cullet has been poured thereinto.

Conveyometer

Mercury switch 153 in the cycle controller is operated by cam 154 and connects line 61 to line 155, before the cullet scale has made four weighings. In other words, the cam 126 operates its switch 125 three times before the switch 153 is operated. This action energizes the coil 156 in conveyometer motor relay 121, and closes contacts 119 and 157. Coil 158 in conveyometer motor starter 159 is also energized, causing conveyometers to function. The conveyometer motor limit switch 161 is closed until the end of the operation.

The mercury switch 153 is then opened by cam 154, but circuits in conveyometer motor relay 121 and conveyometer motor starter 159, remain closed due to holding circuit through limit switch 161.

At the completion of the conveyometer cycle, the limit switch 161 opens. The contacts in relay 121 and the contacts in starter 159, then open, stopping the conveyometer motor 90.

Inside elevator

Mercury switch 162 is operated by cam 163 on the cycle control shaft 76 and functions to operate the collecting screw 43 located to receive the material discharged from the cullet scale and conveyometer. The discharge from this collecting screw is at the bottom of the bucket elevator 44.

The circuit is from line 61 through switch 162 to line 164, which connects to one side of the line starter coil 165 in elevator motor starter 166. When this coil becomes energized, the line starter 166 completes the circuit to the motor 46.

Batch mixer

Mercury switch 167 is operated by cam 168 and starts and stops the motor 48 that drives the batch mixer 47. Line 61 connects through switch 167 and line 169 to one side of coil 171 in the mixer motor starter 172. When this coil becomes energized, the starter completes the circuit and causes the mixer 47 to operate.

The mercury switch 173 is operated by cam 174 on the cycle control shaft 76. It functions to discharge the mixer 47, when the batch has been mixed for a predetermined period of time.

Line 61 connects through switch 173 and line 175 to one side of coil 176 in the mixer tilt solenoid starter 177, closing this starter and energizing the solenoid 102. This solenoid opens air valve 178 which, in turn, operates discharge mechanism 179 of the batch mixer 47.

Dust collector

The mercury switch 181 is operated by cam 182 to energize the coil in the dust collector line starter so that said dust collector will operate when the batch mixer is started. One feature in connection with the dust collector 55, is that the cycle control switch 181 is used to start it, but a manual stop button is used to stop it. This feature eliminates a dust hazard that would exist if the dust collector were stopped each time the charging unit was stopped.

When loading the cullet bin 23 from the basement, manual switch 183 is closed to run the dust collector 55, and the outside elevator 12 only.

When loading the cullet bin from inside, manual switch 184 is closed to operate dust collector 55 and outside elevator 12 or manual switch 185 is closed to operate dust collector 55, outside elevator 12, and cullet crusher 17.

In the operation of the dust collector with the batch mixer, mercury switch 181 is operated by cam 182 and closes immediately after the start button 64 is pressed, connecting line 186 to line 61. Line 186 connects to line 187 through manual stop switch 188. Line 187 connects to line 189 and one side of coil 191 in relay 192, through manual stop button 193. The other side of the coil connects with line 62 through line 194.

When coil 191 is energized, contact 195 closes connecting line 196 to line 61. One side of the coil 197 in dust collector motor starter 198, is thereby connected to line 61, thus causing this coil to be energized, also closing line starter contacts 199, 201 and 202 to energize dust collector motor 54.

Outside elevator and crusher

To manually operate the outside elevator 12 and dust collector 55 only, switch 183 inside, or 184 outside the building 11, is closed, to connect lines 203 and 204 to line 61. This action energizes coils 197 and 205, disposed respectively, in dust collector motor starter 206 and elevator motor starter 207, in order to cause operation of the dust collector motor 54 and the elevator motor 15.

Bindicator switch 26 is located in cullet bin 23, fed by outside elevator 12, and functions to stop the elevator when the cullet bin is filled to a predetermined point indicated in Figure 1.

Manually closing the switch 185, causes operation of the outside elevator 12, dust collector 55 crusher 17, by energizing coils 197, 205 and 208 disposed respectively in dust collector motor starter 206, elevator motor starter 207, and crusher motor starter 209. As in connection with the preceding description of operation by closing switch 183 or switch 184, bindicator switch 26 is part of the circuit.

From the foregoing description of the mechanism, circuits and operation, it will be seen that we have provided for the automatic weighing, conveying, elevating, mixing, discharging and collecting of material for use in making glass, while eliminating the dust hazard formerly present in connection with such operations.

The crushing of the cullet, or other material comprising the major portion of the glass batch, the elevating of said cullet, and keeping the cullet bin with sufficient material therein, is not automatic, except that the automatic mechanism will not start if there is not sufficient cullet in the bin for at least one batch, and the filling mechanism will stop when the level of the cullet in the bin reaches a predetermined point.

Summary of operations

Figure 5 is a chart showing graphically one cycle of operations, which normally takes ten minutes. From this chart it will be seen that there are mercury switches for automatically controlling given parts of the apparatus in accordance with cams, all of said cams being fixed on a single shaft. That is, upon operating the starting button 64, the switch 74 closes and inaugurates a holding circuit to keep the cycle-control motor 59 running, even upon release of the starting button. The mercury switch 83 closes the circuit to the cycle-control motor, thereby causing said motor to operate until the end of the cycle.

Mercury switch 125 is periodically closed and opened to cause the cullet scale to make ten weighings during one cycle.

Mercury switch 153 operates after three weighings have been made by the cullet scale to cause the conveyometer to supply the necessary auxiliary chemicals to the cullet for making the desired kind of glass.

Mercury switch 162 closes to cause the conveyor screw 43 and elevator 44 to operate and fill the mixer until all the materials provided by the cullet scale and conveyometer have been transferred to the mixer 47.

Mercury switch 167 operates, preferably one hundred seconds after starting the cycle, to cause mixing of the material received from the elevator, until it is discharged near the end of the cycle.

Mercury switch 173 closes near the end of the cycle, after the material has been well mixed, in order to cause said material to be discharged into the batch box 51.

Mercury switch 181 is closed at about the beginning of the cycle to start the dust collector operating, after which it will normally run for the entire cycle and the operation thereof has to be stopped manually.

Mercury switch 116 short circuits certain safety switches in order to provide for the continuation of the cycle after it has been started.

It will, therefore be seen, that we have provided automatic machinery which takes material from several bins, mixes it in the desired proportions, and automatically fills a batch box therewith, the operation then automatically stopping until the filled batch box has been removed and replaced by an empty one.

It should, however, be noted that, as an alternative, the batch mixer can be installed underneath the screw conveyor and thus eliminate the bucket elevator 44.

We can change the control cams and switches so that any number of weighings of cullet occur ahead of the chemicals followed by cullet, or promiscuously intermix the weighings of cullet and any chemical.

We can vary the time of mixing in the mixer itself, also the amount of batch going into the mixer. We are not tied up to the use of bulb cullet or any special glass material since we can use crushed bottle glass mixed with chemicals, also we can start with glass raw materials, such as, sand, lime and soda, with or without glass cullet mixed in.

We can also tie the mixing equipment in with an overhead rail system, to mechanically and electrically transport the batch boxes to and from the batch mixer, automatically place the empty batch box under the mixer discharge, automatically start the mixer as the empty box is thus placed, and then automatically discharge the batch box from under the mixer discharge and along the rail system, with the mixer automatically stopped and held idle during the placement and removal of the batch box. As an alternative, the mixer may still function to mix a new batch while the removal and placement of the batch box is going on, that is, as regards the outgoing filled box and the incoming empty box.

Although a preferred embodiment of our invention has been disclosed, it will be understood that modifications may be made within the spirit and scope of the appended claims.

We claim:

1. Apparatus for automatically handling materials for glass making, comprising a motor, a control shaft, reduction gearing between said motor and shaft so that when the former is operated the latter turns slowly at a predetermined speed, a series of cams mounted on said shaft and each associated with a mercury switch for automatically controlling certain apparatus, one of said switches controlling said motor, said apparatus including an automatic scale, another of said switches controlling said scale so that it makes ten weighings of glass material during one cycle of operations and discharges said weighings, a conveyor to receive said weighings, a conveyometer for measuring predetermined amounts of modifying chemicals for addition to said glass material, and a switch for operating said conveyometer after the scale has made four weighings, to cause the latter to discharge said modifying chemicals into said conveyor, an elevator associated with said conveyor, another of said switches controlling said conveyor and elevator to cause operation thereof for a predetermined part of the cycle, a mixer associated with said elevator, a solenoid controlling the discharge from said mixer, and a batch box associated with said mixer, whereby the conveyor and elevator feed the mixer, until the materials supplied thereto have been transferred to said mixer, another mercury switch operating said mixer for a predetermined period of time, when another switch initiates a circuit through said discharge solenoid, causing the material to be removed from said mixer and deposited in said batch box.

2. Apparatus for automatically handling materials for glass making, comprising a control shaft, means for turning said shaft slowly at a predetermined speed, a series of cams carried by said shaft, a switch associated with each cam for automatically controlling parts of said apparatus, one of said switches controlling the turning of said shaft, said apparatus including an automatic scale, another of said switches controlling said scale so that it makes a desired number of the glass material weighings during one cycle of operations, and discharges said weighings, a conveyor to receive said weighings, a conveyometer for measuring predetermined amounts of modifying chemicals, a switch for operating said conveyometer after the scale has made a desired number of weighings to cause the latter to discharge said modifying chemicals into said conveyor, an elevator associated with said conveyor, another of said switches controlling said conveyor and elevator to cause operation thereof for a predetermined part of the cycle, a mixer associated with said elevator, means controlling the discharge from said mixer, and a receptacle associated with said mixer, whereby the conveyor and elevator feed the mixer until the materials have been transferred to the latter, another switch operating said mixer for a predetermined period of time, when still another switch initiates a circuit through said discharge solenoid, causing the material in said mixer to be deposited in said receptacle.

3. Apparatus for automatically handling materials for glass making, comprising a control shaft, means for turning said shaft at a predetermined speed, a series of cams carried by said shaft, a switch associated with each cam for automatically controlling parts of said apparatus, one of said switches controlling the turning of said shaft, said apparatus including an automatic scale, another of said switches controlling said scale so that it makes a desired number of glass material weighings during one cycle of operations and discharges said weighed material, a conveyor to receive said material, a conveyometer for measuring predetermined amounts of modifying chemicals, a switch for operating said conveyometer after the scale has made a desired number of weighings to cause the latter to discharge said modifying chemicals into said conveyor, a mixer associated with said conveyor, whereby said conveyor feeds said mixer until the materials have been transferred to the latter, another switch operating said mixer for a predetermined period of time, and still another switch which then causes said mixer to discharge said material.

4. Apparatus for automatically handling materials for glass making, comprising a control shaft, means for operating said shaft, a series of cams carried by said shaft, a switch associated with each cam for automatically controlling parts of said apparatus, said apparatus including means for weighing certain of said materials, another of said switches controlling said weighing means so that it weighs a certain amount of glass material during one cycle of operations and discharges the same, a conveyor to receive said material, means for measuring a predetermined amount of other glass-making material, a switch for causing said measured material to be discharged into said conveyor with said first-mentioned material, a mixer associated with said conveyor, means operating said mixer for a predetermined period of time, said conveyor feeding the mixer in operation until the combined materials have been transferred thereto, and another switch which causes said mixer to discharge.

5. Apparatus for automatically handling materials for glass making, comprising bins for holding glass-making material, a control shaft, means for operating said shaft, a series of cams carried by said shaft, a switch associated with each cam for automatically controlling parts of said apparatus, said apparatus including means for weighing certain materials, another of said switches controlling said weighing means so that it weighs a certain amount of glass material from one of said bins during one cycle of operations and discharges the same, an enclosed conveyor to receive said material, means for measuring a predetermined amount of other glass-making material from another of said bins, a switch for causing said measured material to be discharged into said conveyor with said first-mentioned material, a mixer associated with said conveyor, means operating said mixer for a predetermined period of time, said conveyor feeding the mixer in operation until the combined materials have been transferred thereto, another switch which causes said mixer to discharge into an enclosure, and a dust-collecting system including means for drawing air from said bins, the enclosure of said conveyor, and the mixer-discharge enclosure.

JAMES BRYANT WHITMORE.
FRANK A. NEWCOMBE.